United States Patent Office 3,003,831
Patented Oct. 10, 1961

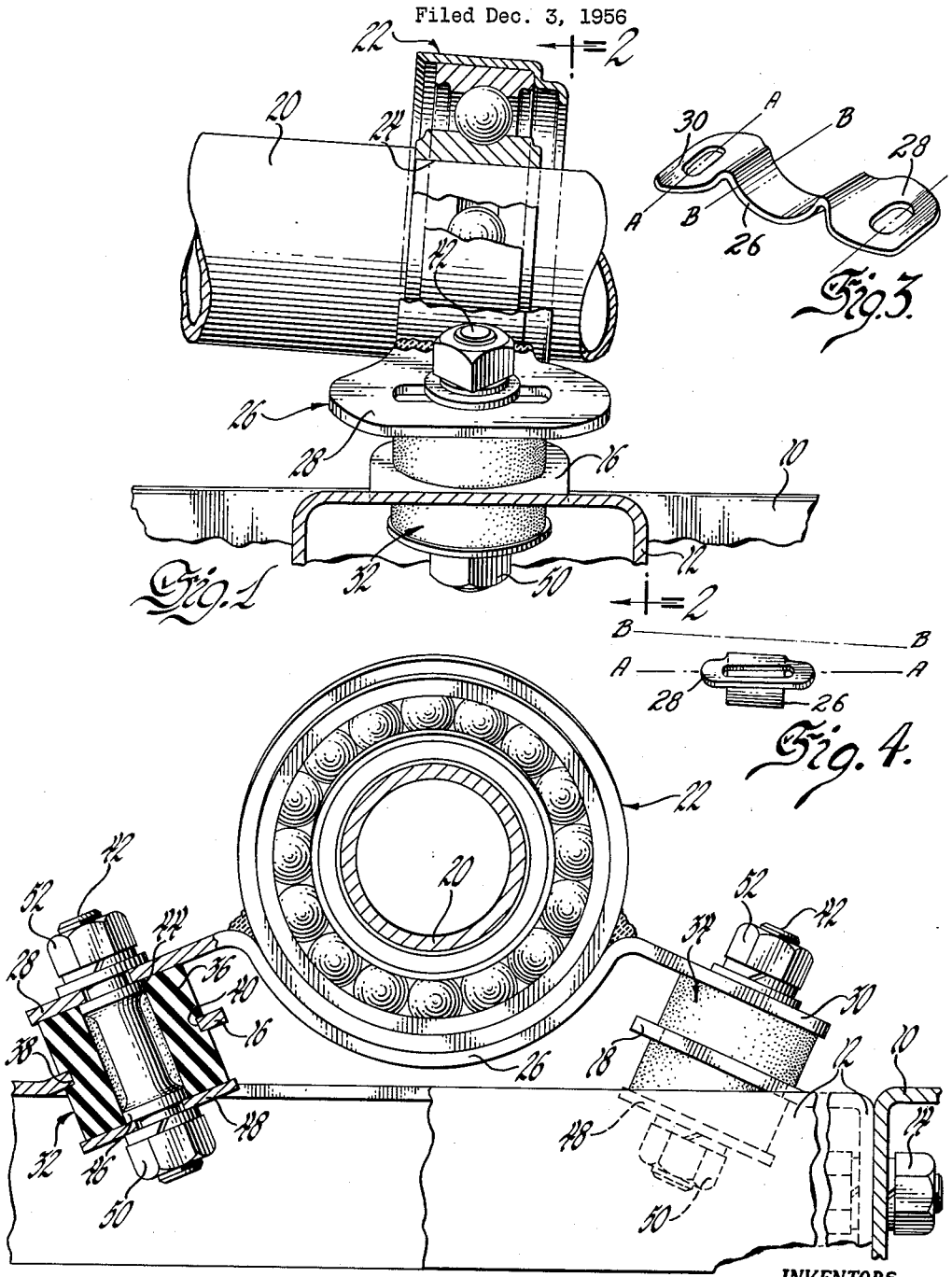

3,003,831
BEARING SUPPORT
Kenneth K. King, Saginaw, and Raymond J. Schultz, Bay City, Mich., assignors to General Motors Corporation, Detroit, Mich., a corporation of Delaware
Filed Dec. 3, 1956, Ser. No. 625,919
1 Claim. (Cl. 308—26)

This invention relates to bearing supports in general and more particularly to the mounting of a drive shaft support bearing in a manner suppressing the general transmission of drive and other noises therethrough.

Front engine rear drive automotive vehicles which are designed to have a low vehicle height are generally provided with a multiple sectioned and jointed drive shaft. One of the principal problems encountered in the use of such drive shafts is that of suppressing the transmission of road and drive disturbances to the vehicle body through the shaft bearing supports necessarily located at the ends of the jointed sections.

Elastic support of the bearing member involves consideration of the asymmetrical loads in the plane of the support bearing resulting from the relative angularity of the shaft sections driving through a universal joint. A degree of rigidity in the mount is also desirable at right angles to the plane of the support bearing to resist axial thrust resulting from end slip of the drive shaft under load conditions. Consequently, the preferred bearing support should have different damping rates in each of three mutually perpendicular planes.

It is here proposed to provide a shaft accommodating elastic bearing support having the elastic or resilient portion thereof angularly disposed relative to the planes of force reaction encountered to best counteract such forces.

In the drawings:

FIGURE 1 is a side view of the proposed bearing support having parts broken away and shown in cross section.

FIGURE 2 is an end view of the bearing support shown by FIGURE 1 taken substantially in the plane of line 2—2 and viewed in the direction of the arrows thereon.

FIGURE 3 is an isometric view of the saddle brace member.

FIGURE 4 is a side view of the saddle brace member shown by FIGURE 3.

One of a pair of spaced vehicle frame rails 10 is shown having a cross or support member 12, which extends between the frame rails, secured thereto as by fastening means 14. The cross member is a U-shaped inverted channel member and has mounting tabs 16 and 18 struck from the upper surface thereof on opposite sides of the center portion of the cross member and extended obliquely over the surface of the cross member and toward each other.

A drive shaft 20 is shown extending transversely and at an inclined angle over the cross member. A ball bearing member 22 is sleeved upon a shoulder portion 24 of the drive shaft just over the cross member. A saddle brace 26 is secured to the underside of the bearing member 22 and includes mounting ears 28 and 30 extending radially of the bearing member and formed to lie substantially parallel to the mounting tabs 16 and 18. Ears 28 and 30 are parallel to the mounting tabs 16 and 18 and lie in planes angularly disposed with respect to the axis of shaft 20 and to the axis of bearing member 22. FIGURE 2 illustrates that these ears 28 and 30 extend downwardly from a horizontal plane through the shaft 20. FIGURE 3 further shows that the ears 28 and 30 are in a plane that is not parallel to the longitudinal axis of shaft 20. More specifically, these ears are twisted relative to the saddle brace portion 26 which receives and supports bearing 22. Line B—B shown in FIGURES 3 and 4 represents the centerline of shaft 20 while line A—A lies in the planes of either of the ears 28 and 30. It is clear from these figures that these lines are not parallel and the vertical planes in which they lie would intersect if extended. The shaft 20, therefore, is supported in an angular relationship relative to the vehicle side rails 10.

Resilient or elastic bushing members 32 and 34 are disposed upon the mounting tabs 16 and 18 and are adapted to have the mounting ears 28 and 30 secured thereover.

The bushing members 32 and 34 include a resilient sleeve 36 having an annular groove 38 provided intermediate the ends thereof. Each bushing sleeve is received within an opening 40 formed within the end of the mounting tab and is disposed to receive the edge of the opening within the annular groove. A bolt member 42 having shoulders 44 and 46 formed near opposite ends thereof is adapted to secure the bushing to the mounting ears with the shoulders spacing the bushing on the bolt and between the mounting ear and a washer 43 held by a nut and lock washer 50 threaded on one end thereof while similar fastening means 52 retain the other end of the bolt to the mounting ears.

The resilient bushings 32 and 34 are obliquely disposed away from each other and generally tangentially of the bearing member 22. The bushings are also angularly disposed relative to the shaft member 20. The oblique disposition of the elastic bushing members relative to the support bearing is such as provides a general balance between vertical and horizontal disturbance forces within the drive shaft and the angular disposition of the mounts relative to a transverse plane normal to the axis of the drive shaft provides a damped support against axial thrusts resulting from end play of the shaft under load conditions.

We claim:

In a motor vehicle having a drive shaft, a bearing member retained on said drive shaft intermediate the ends thereof and disposed in a plane normal to the axis of said drive shaft, a saddle brace secured to said bearing member and having mounting ears extending radially and obliquely from said bearing member in a downward direction, the plane of each of said mounting ears being angularly disposed with respect to the axis of said drive shaft, a support member underlying said bearing member and extending between frame side rails of said motor vehicle, a pair of tabs struck from the surface of said support member and extending obliquely upwardly and in spaced parallel relation to and below said mounting ears, resilient means disposed between said mounting ears and said tabs and secured thereto, said resilient means receiving the weight of said shaft and said bearing member in compression and shear and further receiving vibration forces of said shaft in alternating compression and tension and shear during dynamic conditions to balance vertical and horizontal disturbance forces in said shaft in a plane normal to said shaft, said resilient means receiving axial forces on said shaft in tension and compression to damp axial vibrations in said shaft.

References Cited in the file of this patent
UNITED STATES PATENTS

| | | |
|---|---|---|
| Re. 18,236 | Lee | Feb. 27, 1931 |
| 2,043,725 | Anderson | June 9, 1936 |
| 2,076,034 | Lampman | Apr. 6, 1937 |
| 2,138,656 | Gouldthorpe | Nov. 29, 1938 |

FOREIGN PATENTS

| | | |
|---|---|---|
| 478,868 | Great Britain | Jan. 26, 1938 |
| 473,823 | Canada | May 22, 1951 |